(12) United States Patent
Qureshi et al.

(10) Patent No.: US 7,627,157 B2
(45) Date of Patent: *Dec. 1, 2009

(54) SYSTEM AND METHOD FOR CLASSIFYING FOLLICULAR UNITS

(75) Inventors: Shehrzad A Qureshi, Palo Alto, CA (US); Mohan Bodduluri, Palo Alto, CA (US)

(73) Assignee: Restoration Robotics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/281,613

(22) PCT Filed: Aug. 24, 2007

(86) PCT No.: PCT/US2007/076726

§ 371 (c)(1),
(2), (4) Date: Sep. 3, 2008

(87) PCT Pub. No.: WO2008/024954

PCT Pub. Date: Feb. 28, 2008

(65) Prior Publication Data

US 2009/0080733 A1    Mar. 26, 2009

(51) Int. Cl.
*G06K 9/00* (2006.01)
(52) U.S. Cl. .......................... 382/128; 382/171; 606/187
(58) Field of Classification Search ................. 382/171; 606/9, 133, 187, 13, 167; 424/73, 70.1, 727, 424/60; 128/898; 514/2, 859, 880, 165, 514/848, 21, 513, 12, 44; 435/6, 69.1, 1, 435/320.1, 7.1
See application file for complete search history.

(56) References Cited

U.S. PATENT DOCUMENTS

| | | | |
|---|---|---|---|
| 4,807,163 A | * | 2/1989 | Gibbons ...................... 702/19 |
| 5,331,472 A | | 7/1994 | Rassman |
| 5,782,851 A | | 7/1998 | Rassman |
| 5,895,403 A | | 4/1999 | Collinsworth |
| 6,585,746 B2 | | 7/2003 | Gildenberg |

(Continued)

OTHER PUBLICATIONS

Inaba, M. and Inaba, Y., "Androgenetic Alopecia, Modern Concepts of Pathogenesis and Treatment", 29. Operative Treatment for Androgenetic Alopecia, Springer, 1996, pp. 238-244, 309. (9 pages).

(Continued)

*Primary Examiner*—Sheela C Chawan
(74) *Attorney, Agent, or Firm*—Lena I. Vinitskaya; Vista IP Law Group LLP

(57) ABSTRACT

A system and method for classifying follicular units based on the number of hairs in a follicular unit of interest comprises acquiring an image of a body surface having a follicular unit of interest, processing the image to calculate a contour of the follicular unit and an outline profile which disregards concavities in the contour, and determining the number of defects in the outline profile to determine the number of hairs in the follicular unit. The system and method may also adjust for hairs which converge beneath the skin and for images which appear as a single wide hair but which are actually multiple hairs. In another aspect, a system and method for determining the end points of a follicular unit comprises generating a skeleton of a segmented image and identifying the end points from the skeletonized image.

21 Claims, 10 Drawing Sheets

U.S. PATENT DOCUMENTS

| | | | |
|---|---|---|---|
| 6,949,115 | B2 | 9/2005 | Mascio |
| 6,973,931 | B1 | 12/2005 | King |
| 6,993,168 | B2 * | 1/2006 | Loussouarn et al. ......... 382/128 |
| 7,094,569 | B2 | 8/2006 | Kim et al. |
| 7,130,717 | B2 | 10/2006 | Gildenberg |
| 7,217,266 | B2 | 5/2007 | Anderson et al. |
| 7,277,120 | B2 | 10/2007 | Gere et al. |
| 7,335,641 | B2 | 2/2008 | Kim et al. |
| 2001/0015380 | A1 | 8/2001 | Good et al. |
| 2006/0089555 | A1 * | 4/2006 | Gummer et al. ............. 600/476 |
| 2007/0078466 | A1 | 4/2007 | Bodduluri et al. |
| 2007/0106306 | A1 | 5/2007 | Bodduluri et al. |
| 2007/0106307 | A1 | 5/2007 | Bodduluri et al. |
| 2008/0002809 | A1 | 1/2008 | Bodduluri |
| 2008/0004633 | A1 | 1/2008 | Arata et al. |
| 2008/0033455 | A1 * | 2/2008 | Rassman et al. ............. 606/133 |
| 2008/0216334 | A1 | 9/2008 | Pak et al. |

OTHER PUBLICATIONS

PCT International Search Report for PCT/US07/76726, Forms PCT/ISA/220 and 210, Applicant Restoration Robotics, Inc., dated Apr. 24, 2008, (5 pages).

PCT Written Opinion of the International Searching Authority, for PCT/US07/76726, Forms PCT/ISA/237, Applicant Restoration Robotics, Inc., dated Apr. 24, 2008, (6 pages).

PCT International Search Report for PCT/US07/76728, Forms PCT/ISA/220 and 210, Applicant Restoration Robotics, Inc., dated Apr. 17, 2008, (4 pages).

PCT Written Opinion of the International Searching Authority, for PCT/US07/76728, Forms PCT/ISA/237, Applicant Restoration Robotics, Inc., dated Apr. 17, 2008, (8 pages).

Fisher, Robert, S. Perkins, A. Walker and E. Wolfart, "Gaussian Smoothing", retrieved on Feb. 26, 2008, from the Internet <URL: http://homepages.inf.ed.ac.uk/rbf/HIPR2/gsmooth.htm>, 2003, pp. 1 to 8, (8 pages).

Hoffmann, Rolf and Van Neste, Dominique. "Recent Findings with Computerized Methods for Scalp Hair Growth Measurements". JID Symposium Proceedings. 10:3 Dec. 2005. pp. 285-288.

Jimenez, Francisco, MD and Ruifernandez, J. M. PhD. Distribution of Human Hair in Follicular Units—A mathematical Model for Estimating the Donor Size in Follicular Unit Transplantation. Dermatol Surg 1999; 25: pp. 294-298.

Lyubovitsky J. G. and Krasieva T. B. "In situ multiphoton optical tomography of hair follicles in mice". Journal of Biomedical Optics, 12(4), 044003 (Jul./Aug. 2007). pp. 044003-1 to 044003-8.

Canfield, Douglas, BS, "Photographic Documentation of Hair Growth in Androgenetic Alopecia", Dermatologic Clinics, vol. 14, No. 4, Oct. 1996, pp. 713-721.

* cited by examiner

SYSTEM AND METHOD FOR CLASSIFYING FOLLICULAR UNITS

RELATED APPLICATION DATA

This Application is a U.S. National Stage filing under 35 U.S.C. §371 of International Application No. PCT/US2007/076726, filed Aug. 24, 2007, which claims priority to U.S. patent application Ser. No. 11/467,268, filed Aug. 25, 2006. Priority to the aforementioned applications is hereby expressly claimed in accordance with 35 U.S.C. §§ 119, 120, 365 and 371 and any other applicable statutes.

FIELD OF INVENTION

This invention relates generally to hair transplantation procedures and more particularly to a system and method for classifying follicular units using digital imaging and processing techniques for use in hair transplantation procedures.

BACKGROUND

Hair transplantation procedures are well-known, and typically involve (in a patient having male pattern baldness) harvesting donor hair grafts from the side and back fringe areas (donor areas) of the patient's scalp, and implanting them in a bald area (recipient area). Historically, the harvested grafts were relatively large (3-5 mm), although more recently, the donor grafts may be single follicular units. In particular, "follicular units" (also referred to herein as FU or FUs) are naturally occurring aggregates of 1-3 (and much less commonly, 4-5) closely spaced hair follicles that are distributed randomly over the surface of the scalp.

The follicular units may be classified, or "typed," based on the number of hairs in the unit and identified in shorthand as an "F1" for a single hair follicular unit, an "F2" for a two hair follicular unit and so on for follicular units with 3-5 hairs. In some cases of multiple hair follicular units, the hairs may appear to emanate from a single follicle or point in the skin. In other cases, the hairs may exit the skin surface at slightly spaced apart positions, but converge into a single follicular unit beneath the skin. Referring to FIG. 1, a print of a digital image of an exemplary section of a human scalp 11 having a variety of types of follicular units is shown. For example, the follicular unit 13 has two hairs and is therefore an F2, while follicular unit 15 is an F1 since it has only a single hair. Similarly, follicular unit 17 appears to be an F3 having three hairs.

There are several reasons it is important and desirable to identify and classify follicular units based on the number of hairs in the follicular unit. For one, it is preferable to transplant certain classes of follicular units into specific regions of the scalp. For example, single hair follicular units (F1s) are commonly implanted along the hairline that frames the face. Follicular units with more than one hair (F2s, F3s, etc.) are commonly implanted in the mid-scalp and crown. This arrangement of follicular unit distribution is thought to produce a more natural appearing aesthetic result. Still, it may be desirable to utilize a variety of classes (also referred to as "types") of follicular units to provide the desired attributes for the appearance of the transplanted hair. Such attributes can include the density of hair, the direction or orientation of hair, the particular mix of types of follicular units, and/or the appearance of randomness, among other possible attributes.

In addition to classifying follicular units based on the number of hairs they contain, locating and identifying the end points of each such hair in a follicular unit may also be desirable in planning and performing hair transplantation procedures. One end point, typically located on the surface of the skin and called the "tail" is the point from which one or more hairs of the follicular unit emerge from the skin. Another end point is called the "head" and corresponds to the tip of each hair of the follicular unit lying above the skin surface. Thus, a single hair follicular unit has one head while a two-hair follicular unit has two heads. Another end point of the follicular unit located below the surface of the skin is called the "bulb" and corresponds to the location/end point where one or more hairs of the follicular unit originate subcutaneously. One reason it is desirable to know the location of various relevant end points is to be able to harvest the follicular unit and then implant it without damaging it, or its parts. For example, if an F2 follicular unit has one hair longer than the other so that head 1 is located further from the skin than head 2, often it indicates that underneath the skin the principal direction of the follicular unit extends in the direction of the axis of the hair having head 1. Therefore, knowing the location of the each head of a follicular unit may help to determine the angle and orientation of the follicular unit under the skin surface, which in turn can be used to better position the harvesting tool, thereby reducing the chance of hair transection while harvesting, and also improving the efficacy of the hair transplantation procedure.

Various procedures for hair transplantation have been previously disclosed, including both manual and mechanized to certain degrees of automation. In one well-known manual process, a linear portion of the scalp is removed from a donor area by dissection with a scalpel down into the fatty subcutaneous tissue. The strip is dissected (under a microscope) into the component follicular units, which are then implanted into a recipient area in respective puncture holes made by a needle. Forceps are typically used to grasp and place the follicular unit grafts into the needle puncture locations, although other instruments and methods are known for doing so.

In "Androgenetic Alopecia" (Springer 1996), M. Inaba & Y. Inaba disclose and describe a manual method for harvesting singular follicular units by positioning a hollow punch needle having a cutting edge and interior lumen with a diameter of 1 mm, which is about equal to the diameter of critical anatomical parts of a follicular unit. The needle punch is axially aligned with an axis of a follicular unit to be extracted and then advanced into the scalp to cut the scalp about the circumference of the selected follicular unit. Thereafter, the follicular units are easily removed, e.g., using forceps, for subsequent implantation into a recipient site with a specially devised insertion needle.

U.S. Pat. No. 6,585,746 discloses an automated hair transplantation system utilizing a robot, including a robotic arm and a hair follicle introducer associated with the robotic arm. A video system is used to produce a three-dimensional virtual image of the patient's scalp, which is used to plan the scalp locations that are to receive hair grafts implanted by the follicle introducer under the control of the robotic arm. The entire disclosure of U.S. Pat. No. 6,585,746 is incorporated herein by reference.

Automated systems and methods for transplanting are also disclosed in U.S. provisional patent application Ser. Nos. 60/722,521, filed Sep. 30, 2005, 60/753,602, filed Dec. 22, 2005, and 60/764,173, filed Jan. 31, 2006, and U.S. patent application Ser. No. 11/380,903, filed Apr. 28, 2006 (now published as US 2007/0078466) and Ser. No. 11/380,907, filed Apr. 28, 2006 (now published as US 2007/0106306). The foregoing applications are all hereby incorporated by reference into the present application in their entirety.

For example, U.S. patent application Ser. No. 11/380,907, referenced above, the disclosed system comprises a robotic arm having a harvesting and/or implantation tool mounted on the arm. One or more cameras are also mounted on the arm and are used to image the work space, such as a body surface. A processor is configured to receive and process images acquired by the cameras. A controller is operatively coupled to the processor and the robotic arm. The controller controls the movement of the robotic arm based, at least in part, on the processed images acquired by the cameras and the processor. The arm is controllably moveable to position the tool at a desired orientation and position relative to the body surface to perform transplantation of hairs.

In utilizing any of these systems and methods for hair transplantation, it is desirable to first plan the transplantation to select the follicular units to be harvested and transplanted and to determine the precise location where the hairs are to be implanted. Accordingly, in planning a hair transplantation procedure, specific follicular units from a specific location on a body surface may be selected for harvesting and transplantation into a different part of the body surface. The follicular units to be transplanted may be selected based on certain criteria, for example, the type of follicular unit (i.e. F1, F2, etc.), the orientation of the hair in the follicular unit, the density of the hair, etc. However, the process of counting and characterizing each follicular unit can be tedious and time consuming. Therefore, there is a need for a system and method for classifying follicular units, including identifying the end points of each hair of the follicular unit, using an automated system.

SUMMARY

In accordance with a general aspect of the inventions disclosed herein, a system and method for classifying follicular units using an automated system is provided. The system and method of the present invention may be utilized with systems and methods for transplantation of hair follicular units on a body surface. The system and method of the present invention is especially useful when implemented on, or integrated with, an automated system for hair transplantation.

In one aspect of the present invention, the method of classifying follicular units comprises acquiring an image of a body surface in which there are follicular units (FU) and processing such image to produce a segmented image of the FU. In one exemplary embodiment the segmented image is a binary image. From the segmented image of the FU, a contour around the outer perimeter of the hair(s) of the FU may be calculated. For example, for an F1, the contour would generally be a line or surface following the outer surface of the single hair. For a relatively straight hair, the contour would look like a rectangle. For an F2, the hairs typically form a "V" shape such that the contour looks like a block lettered "V".

The segmented image also allows the calculation of an outline profile of the FU. The outline profile disregards concavities in the contour of the image. For instance, for an F2, there is a concavity or "inwardly curved" portion in the contour formed by the descent in the contour from the one side of the top of the "V" to the vertex of the "V" and back up to the other side of the top of the "V". The calculated profile disregards this concavity such that the resulting outline profile looks like a triangle with one of the vertices of the triangle generally tracing the vertex of the "V" of the contour of the FU.

The outline profile is then compared to the contour to determine the number of "defects" in the outline profile. A defect in the outline profile may be defined, for example, as each of the concavities in the outline profile which divert from the contour. In the F2 example, there is one defect in the outline profile represented by the concavity formed by the "V" shape. In an F3, the contour will be generally shaped like two Vs sharing a common vertex and with one line forming one side of both Vs. The outline profile of an F3 will also have a generally triangular shape (although it may be a wider triangle than an F2). Thus, an F3 will have two defects. Therefore, it can be seen that the number of defects has a direct relationship to the type of follicular unit. In this case, the number of hairs for the FU equals the number of defects minus one.

In one embodiment of the method of classifying follicular units, the outline profile may be determined by calculating a convex hull contour pursuant to well-known image processing techniques. Other appropriate techniques for determining the outline profile are also within the scope of the present invention.

In another aspect of the method of the present invention, a procedure is provided for tracking the FU of interest to adjust for relative movement between an image acquisition device and the FU. In one exemplary embodiment, 2 cameras may be used to track an FU of interest within the images of the first and second cameras to adjust for movement of the body surface and/or movement of the cameras. In addition, the first and second cameras are aligned with the general orientation of the hair of the FU. In this way, an image is obtained which provides good quality data for performing the remaining steps of the method of classifying the FU. However, the tracking procedure could be performed with multiple image acquisition devices, such as cameras, as well as with a single camera by taking multiple images from various angles, including panoramic images. Moving of the camera could be accomplished either manually or with the assistance of a robot if the system used is a robotic system.

In still another aspect of the present invention, the method of classifying a follicular unit may also adjust for follicular units having hairs which converge below the surface of the skin. In such case, the image will contain an image of a hair which is not a contiguous part of the contour of the FU of interest. To account for this situation, it is determined whether the separate hair is within a maximum distance from the hair(s) defining the contiguous contour of the FU of interest. The maximum distance is set to be a distance in which what appears to be a hair from a separate FU is most likely a part of the same FU as the FU of interest. The classification of the FU of interest then takes into account any additional hair(s) which are within a maximum distance from the hair(s) of the FU of interest.

In yet another aspect of the present invention, the method of classifying a follicular unit may also adjust for hair images which appear to be a single hair but are in actuality multiple hairs. If the digital image is taken at a certain angle to the hairs of an FU, the image of the hairs may merge and appear to be one hair. Thus, determining the number of defects will not provide an accurate classification because the merged hairs will result in fewer defects in the outline profile (and therefore fewer hairs) than are actually present in the FU of interest. To account for this situation, the method determines the width (or caliber) of each object representing a hair in the FU of interest and compares it to the width of a single hair. The step of classifying the FU maybe also based on a result of determination whether the width of an object representing a hair exceeds the maximum expected width. For example, if the width is between 1½ and 2 times the expected width, then the step of classifying will approximate such object as being two hairs. A similar approximation can be done for 3, 4 or 5 hairs.

In a further aspect of the present invention, a method is provided for determining the end points of a follicular unit (FU). This method allows the determination of the end points of a FU both on or above the surface of the skin as well as subcutaneous end point(s). This method comprises acquiring an image of a body surface containing an FU, processing the image to produce a segmented image of the FU, generating a skeleton of the segmented image of the FU, and determining from the skeleton at least one end point of the FU. Generating a skeleton or "skeletonization" is a process for reducing foreground regions in a segmented image to a skeletal remnant. The method of the present invention is not limited to a particular technique or method for generating a skeleton of the image of interest, but rather covers all appropriate methods, including, by way of example and not limitation, a thinning approach, an edge detection based techniques, Hilditch's algorithm, approximation of the skeleton using singularities in the distance transform, and others. In some embodiments, the method of determining the end points is further refined by using multiple images (including stereo images), or by determining the contour of the image as an additional data verification for generating the skeleton.

The system for classifying an FU using an automated system comprises an image acquisition device and an image processor. One example of the image acquisition device is one or more cameras, such as any commercially available cameras. Instead of a camera, it could be a video recording device (such as a camcorder) or any other image acquisition device. While stereo imaging devices are very useful in the present invention, it is not necessary to employ stereo imaging. Similarly, while it is preferred that the image acquisition device be a digital device, it is not necessary. It could be, for example, an analog TV camera that acquires an initial image which is then digitized into a digital image for further use in the method of the present invention. The image processor may comprise any device programmed and configured to perform the method of classifying an FU according to the present invention. One non-limiting example of a suitable image processor is any type of personal computer ("PC"). Alternatively, the image processor may comprise an Application Specific Integrated Circuit (ASIC) or Field Programmable Gate Array (FPGA). The image processor may be programmed with software configured to perform the methods of the present invention.

Similar to a system for classifying an FU, a system is also provided for determining the end points of an FU. The system for determining the end points may comprise the same or different image acquisition device as described above in reference to the system for classifying FU, and it also may comprise an end-point image processor programmed and configured to perform a method of determining the end points of follicular units. The end-point image processor may be provided either separately or in combination with the image processor for classifying the FU, depending on the system used.

In still another aspect of the present invention, an image processor for classifying an FU is provided. The image processor comprises any suitable computing device, such as a PC or other processor, and is configured to receive an image of the FU, process the image to produce a segmented image of the FU, calculate a contour of the segmented image of the FU, calculate an outline profile of the segmented image which disregards concavities in the contour of the segmented image of the FU, determines the number of defects in the outline profile of the FU, and classifies the FU at least partially based on the number of determined defects.

In yet another aspect of the present invention, an image processor for determining at least one end point of an FU is provided. The image processor for determining at least one end point of a FU comprises any suitable computing device, such as a PC or other processor, and is configured for receiving an image of the FU, processing the image to produce a segmented image of the FU, generating a skeleton of the segmented image of the FU, and determining from the skeleton at least one end point of the FU.

In another aspect of the present invention, an image processor is provided which performs both of the processes of classifying an FU and determining at least one end point of an FU. The image processor may be any of the image processor described above, which is configured to perform the steps of the FU classification and the end point determination. The image processor for classifying follicular units, or the end-point image processor, or the combined image processor performing both functions could be used in conjunction with various hair transplantation and treatment systems and devices, including but not limited to systems for hair harvesting, or hair implantation, or hair classification, or hair treatment planning systems.

The system for classifying follicular units (as well as the system for determining the end points of follicular units) using an automated system may comprise any of the transplantation systems described in the background above. For instance, the system described in U.S. patent application Ser. No. 11/380,907 may be programmed and configured to perform the methods of classifying a follicular unit according to the present invention. The cameras on the system can provide stereo digital images and the robotic arm can properly position and orient the cameras. The selection of a region of interest may be performed by an operator at the user interface of the system (such as a computer having a monitor and input devices) or it could be automated through programming of the computer and/or controller.

Accordingly, a system and method for classifying follicular units and/or determining end points of the follicular units are provided. Other and further embodiments, objects and advantages of the invention will become apparent from the following detailed description when read in view of the accompanying figures.

BRIEF DESCRIPTION OF THE DRAWINGS

The invention is illustrated by way of example and not limitation in the figures of the accompanying drawings, in which like references indicate similar elements, and in which.

DETAILED DESCRIPTION OF THE ILLUSTRATED EMBODIMENTS

Figure 1:
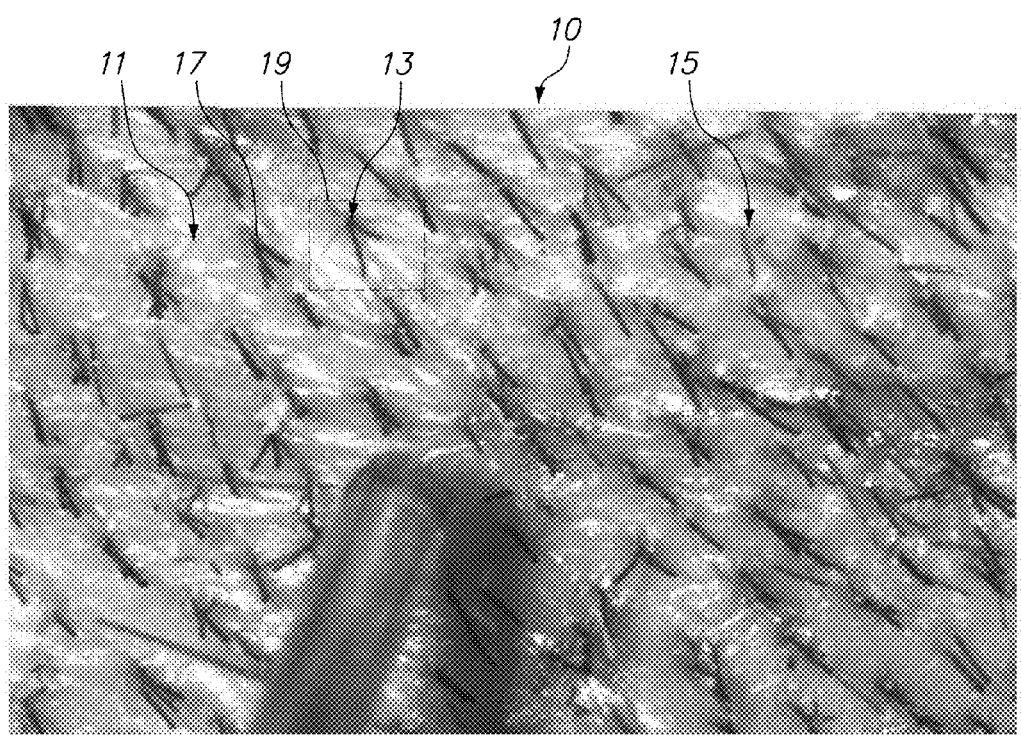
FIG. 1 is a print of a digital image of an exemplary section of a human scalp showing a variety of types of follicular units and a selected region of interest.

Referring first to FIG. 1, one exemplary embodiment of the system and method for classifying follicular units according to the present invention generally begins with acquiring an image 10 of a body surface 11 using an image acquisition device, for example, one or more cameras or any other suitable imaging device. The image acquisition device may produce a digital image, such as that produced by a digital camera, or it may produce an analog image (which may or may not be converted to a digital image at any point in the process). The photo of FIG. 1 is an image of a section of human scalp 11, but it is understood that the body surface could be any area of any body having hair. Although in this description of an exemplary embodiment the image 10 is a digital image taken by a digital camera, the present invention is not limited to digital images taken by digital cameras, but includes the use of any image acquired by any type of image acquisition device. The digital image 10 shows a variety of types of follicular units (FU) on the scalp 11, including a single hair (F1) follicular unit 15, a two hair (F2) follicular unit 13, and a three hair (F3) follicular unit 17.

The digital image 10 may be acquired using one or more digital cameras of an automated hair transplantation system, such as the cameras described in the hair transplantation system of U.S. patent application Ser. No. 11/380,907, which is incorporated by reference herein in its entirety. The image from just one of the cameras can be used to produce the digital image 10. Alternatively, the process for obtaining the digital image 10 may be acquired by a more involved process which aligns the camera(s) to improve the image used to classify a follicular unit of interest. In this process, for example, a first camera and a second camera may be used. The cameras may be arranged and configured to obtain stereo images of a body surface at which the cameras are directed. The cameras are first positioned to be directed at the body surface in an area known to have hair. A first digital image is acquired from the first camera and a follicular unit (FU) of interest is selected from within the first digital image. A second digital image of about the same region of the body surface as the first camera (except from a slightly different angle as provided by stereo cameras) is acquired from the second camera and the same FU of interest is selected from within the second digital image. The FU of interest can be selected in the digital images by an operator of the system or automatically by the system using a selection algorithm. The transplantation system is now able to track the FU of interest within the first and second digital images from the first and second cameras. The tracking procedure can be used to adjust for movement of the body surface and movement of the cameras when they are aligned to acquire the digital image(s) used for classifying the FU. Next, the first and second cameras are moved and oriented to be aligned with the general orientation of the hair of the FU. As the cameras are moved, additional images may be acquired and processed by the system in order to track the FU of interest. By aligning the cameras with the hair of the FU, a better image for classifying the FU can be acquired. With the cameras in the desired alignment, the cameras acquire the images to be used in the next steps of the method of classifying a follicular unit. However, it is not necessary to use two cameras or stereo imaging as described in the above exemplary embodiment. The tracking procedure could be performed with multiple image acquisition devices, such as cameras, as well as with a single camera by taking multiple images from various angles, including panoramic images. The camera may be moved either manually or with the assistance of a robot, in the case where the system used is a robotic system.

After the digital image 10 is acquired, a region of interest 19 which is known to contain the FU 13 of interest (the FU to be classified) may be selected. It should be understood that this step of selecting a region of interest is optional, and is not required according to the method of classifying an FU of the present invention. Instead, the image 10 may be processed as is, and references to a region of interest 19 in this description of an exemplary embodiment are understood to be interchangeable with the image 10. The region of interest 19 may be selected by an operator or the selection may be automated by the system.

Figure 2:
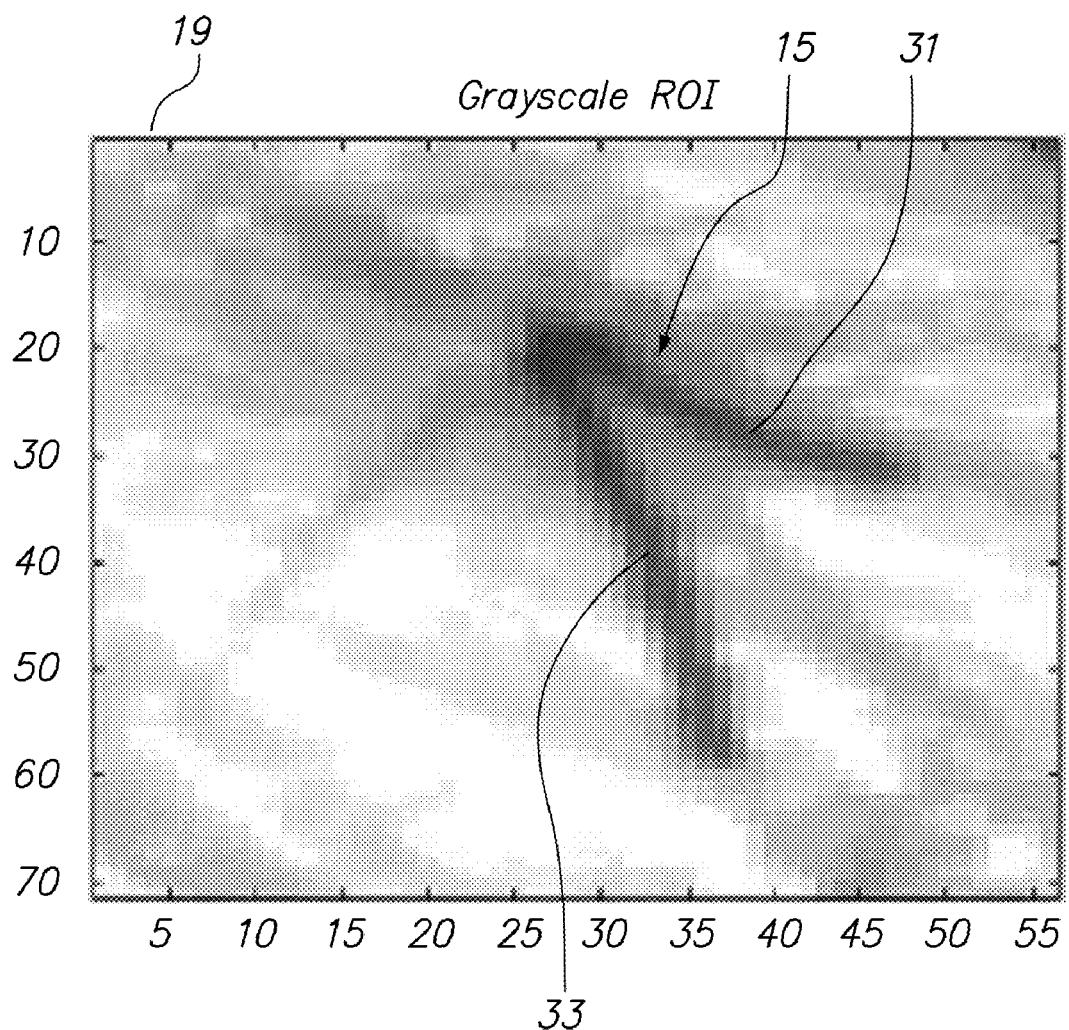
FIG. 2 is a print of a digital image of a single follicular unit.
Figure 3:
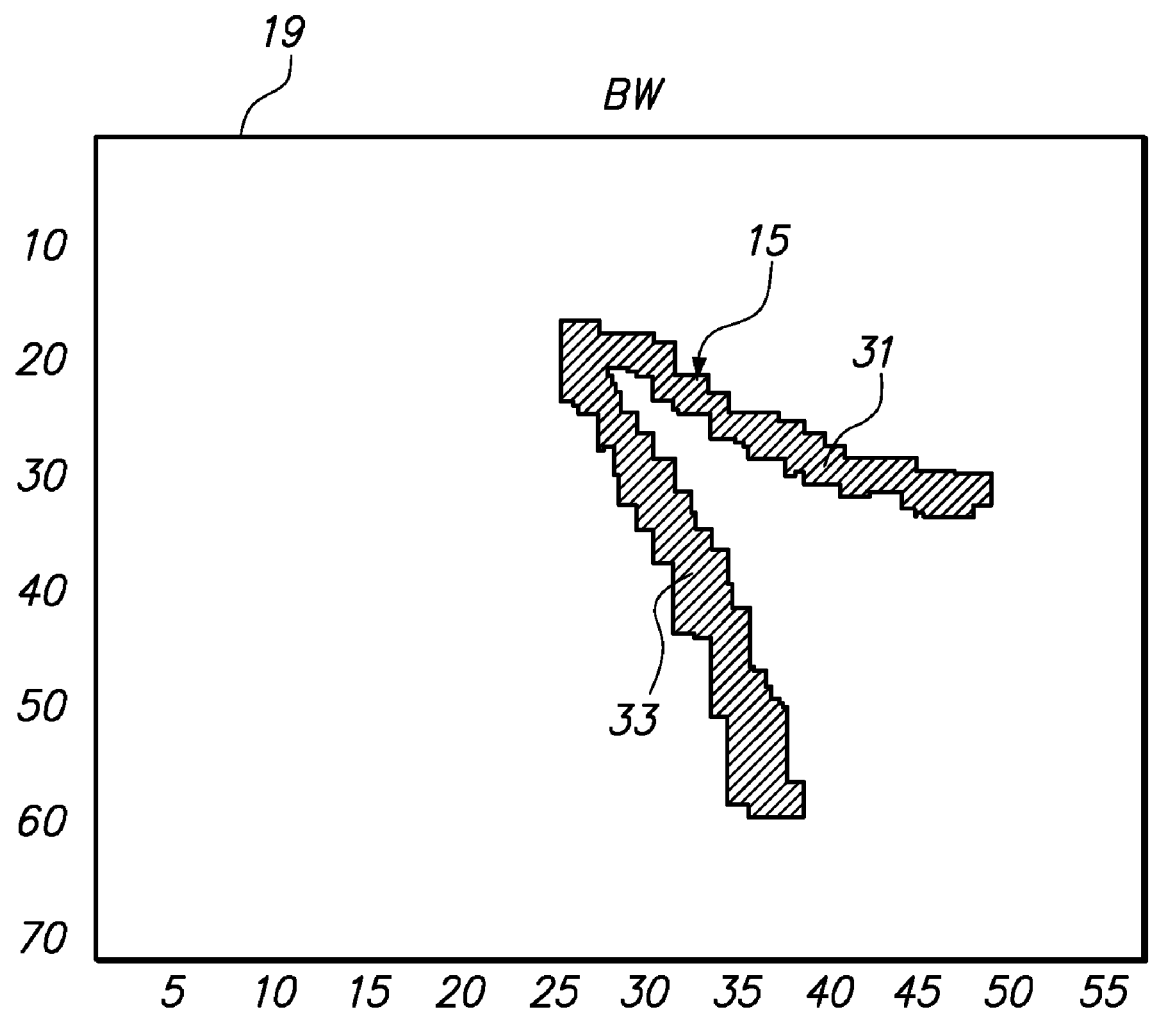
FIG. 3 is a print of the digital image of FIG. 2 after the image has been segmented.

Turning to FIG. 2, the region of interest 19 is shown as a grayscale sub-image of the hairs 31 and 33 of the FU 13. This grayscale digital image of the region of interest 19 and the FU 13 are then processed using well-known digital image processing techniques to produce a segmented image of the FU 13. FIG. 3 shows an exemplary binary image, of the digital image of FIG. 2 after it has been segmented. As one of the objectives in segmenting the image is to separate a foreground (e.g. hair) from the background (e.g. everything else), obtaining a binary image, as shown in FIG. 3, is one easy and convenient choice. However, instead of a binary image, the segmented image may be a multi-modal image, for example, when it is desired to break the background into several parts separating skin, moles, blood, etc.

The outer perimeter of the hairs 31 and 33 of the binary image defines a contour 35 the FU 13. A demonstrative representation of the contour 35 is shown as a dashed line 35 in FIG. 4. In the method of the present invention, a contour 35 may be calculated around the perimeter of the binary image of the hairs 31 and 33, or the pixels making up the outer perimeter of the binary image may be used. As clearly shown in FIG. 4, the contour 35 for an FU having two hairs looks like a block lettered "V".

Figure 4:
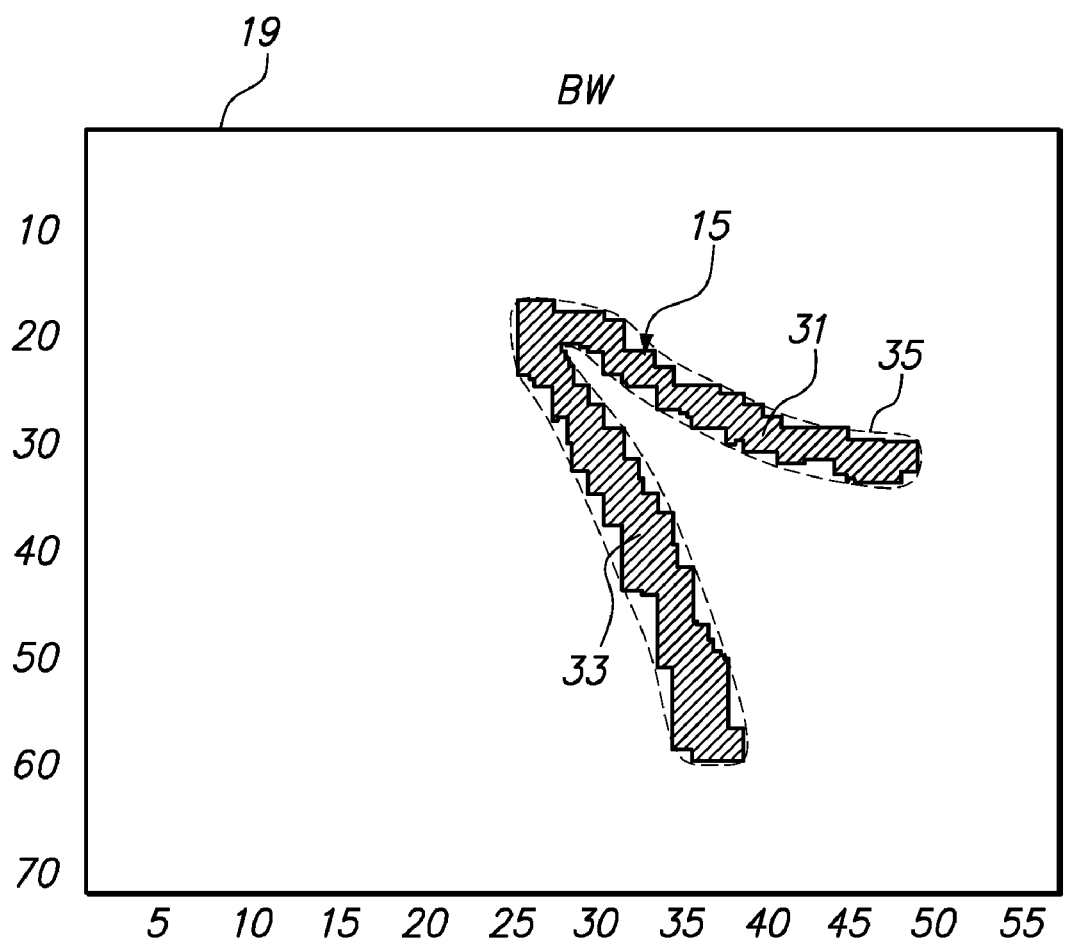
FIG. 4 is a print of the digital image of FIG. 3 with an exemplary contour of the hairs of the follicular unit depicted with a dashed line.
Figure 5:
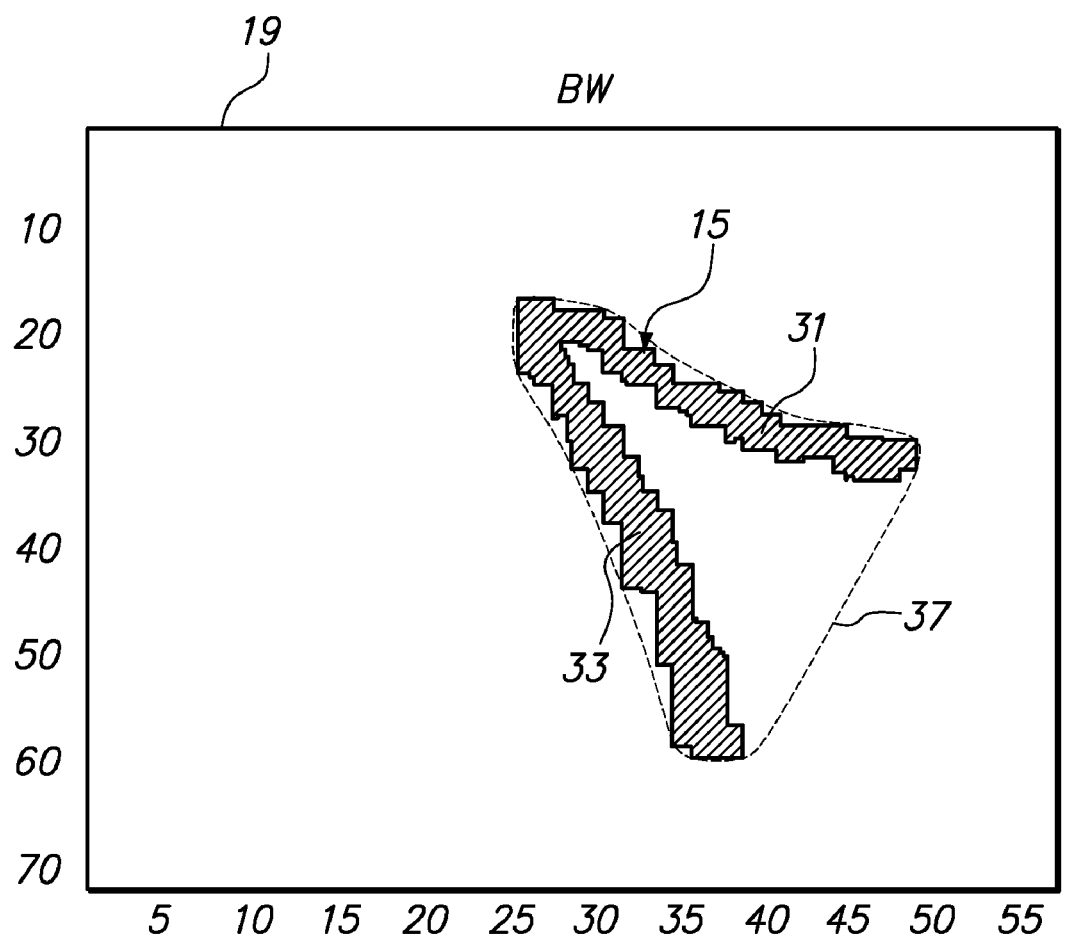
FIG. 5 is a print of the digital image of FIG. 3 with an exemplary outline profile of the hairs of the follicular unit depicted with a dotted line.

An outline profile 37 of the binary image of the FU 15 is calculated. The outline profile 37 is an outline of the geometry of the image with concavities removed. In the present example using the binary image of FU 15 as depicted in FIGS. 3-5, the concavity which will be removed is the space between the two legs of the V-shape. Thus, the calculated outline profile 37 of the binary image of the FU 15 will be a line around the shape having a generally triangular shape as demonstratively represented by the dotted line 37 in FIG. 5. The outline profile may be calculated using any suitable algorithm as known by those of ordinary skill in the art. For example, the outline profile 37 may be determined by calculating a convex hull using well-known image processing techniques.

It should be understood that the step of determining the contour 35 and the step of determining the outline profile 37 may be performed in any order (first the contour and then the outline profile or vice versa), or simultaneously.

Figure 6:
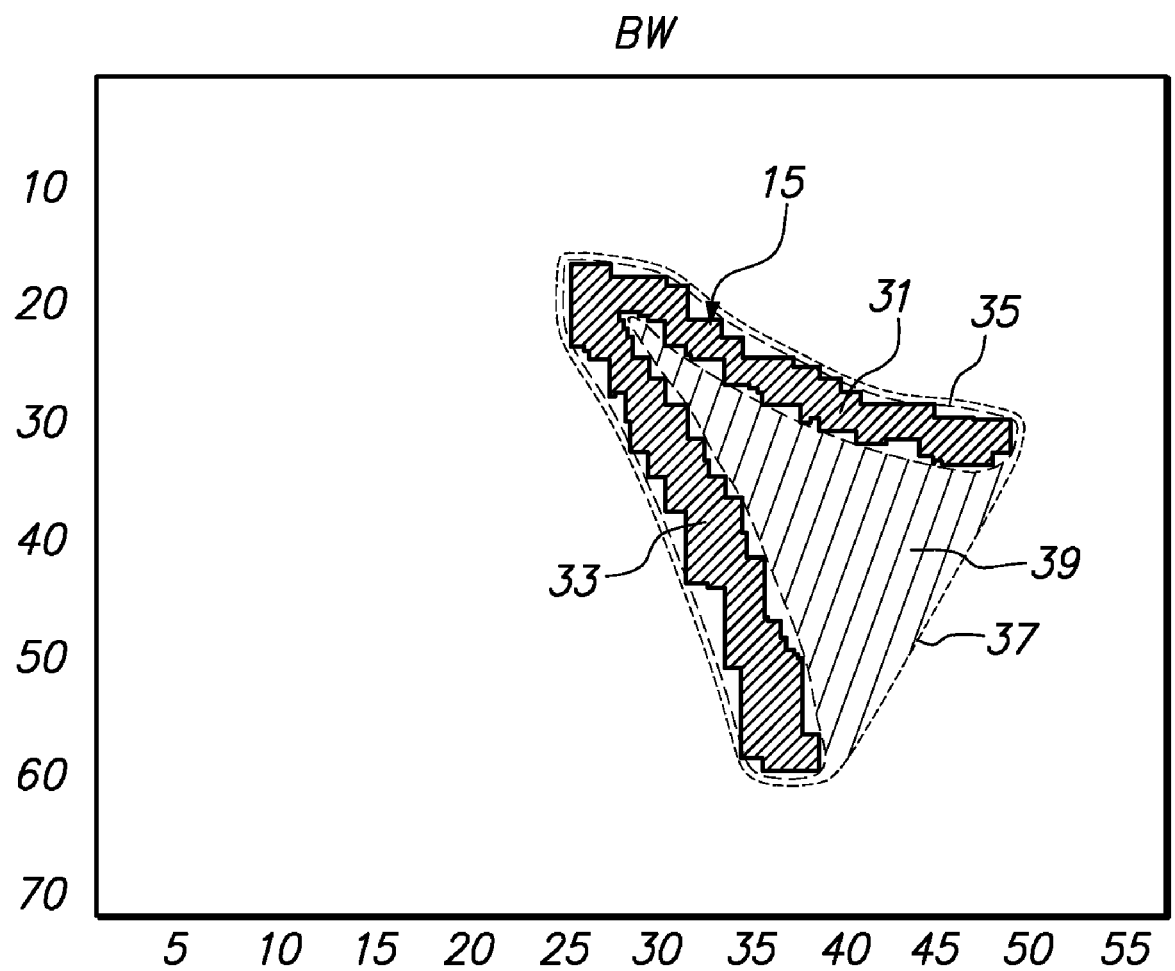
FIG. 6 is a print of the digital image of FIG. 3 showing the defects in the outline profile as compared to the contour of the hairs of the follicular unit.

The outline profile 37 is then compared to the contour 35 to determine the number of concavities that were removed. The concavities that are removed in producing the outline profile are commonly called "defects" in the outline profile. A schematic representation of the step of comparing the outline profile 37 to the contour 35 is shown in FIG. 6. As can be seen in FIG. 6, there is a single defect 39 in the image of FU 15 which is shown as the hatched area.

The number of defects can then be used to calculate the number of hairs in the follicular unit and thereby classify the follicular unit. It can be seen by the geometry of one or more hairs emanating from a single point that the number of hairs will be equal to one more than the number of defects. So, for a single hair FU there will be no defects so the FU will be an F1. For an FU with two hairs, there will be one defect between the two hairs so the FU will be an F2. For an FU with three hairs there will be two defects, one between the first and second hairs and another between the second and third hairs, so the FU will be an F3. And so on for follicular units having 4 or more hairs.

Figure 9:
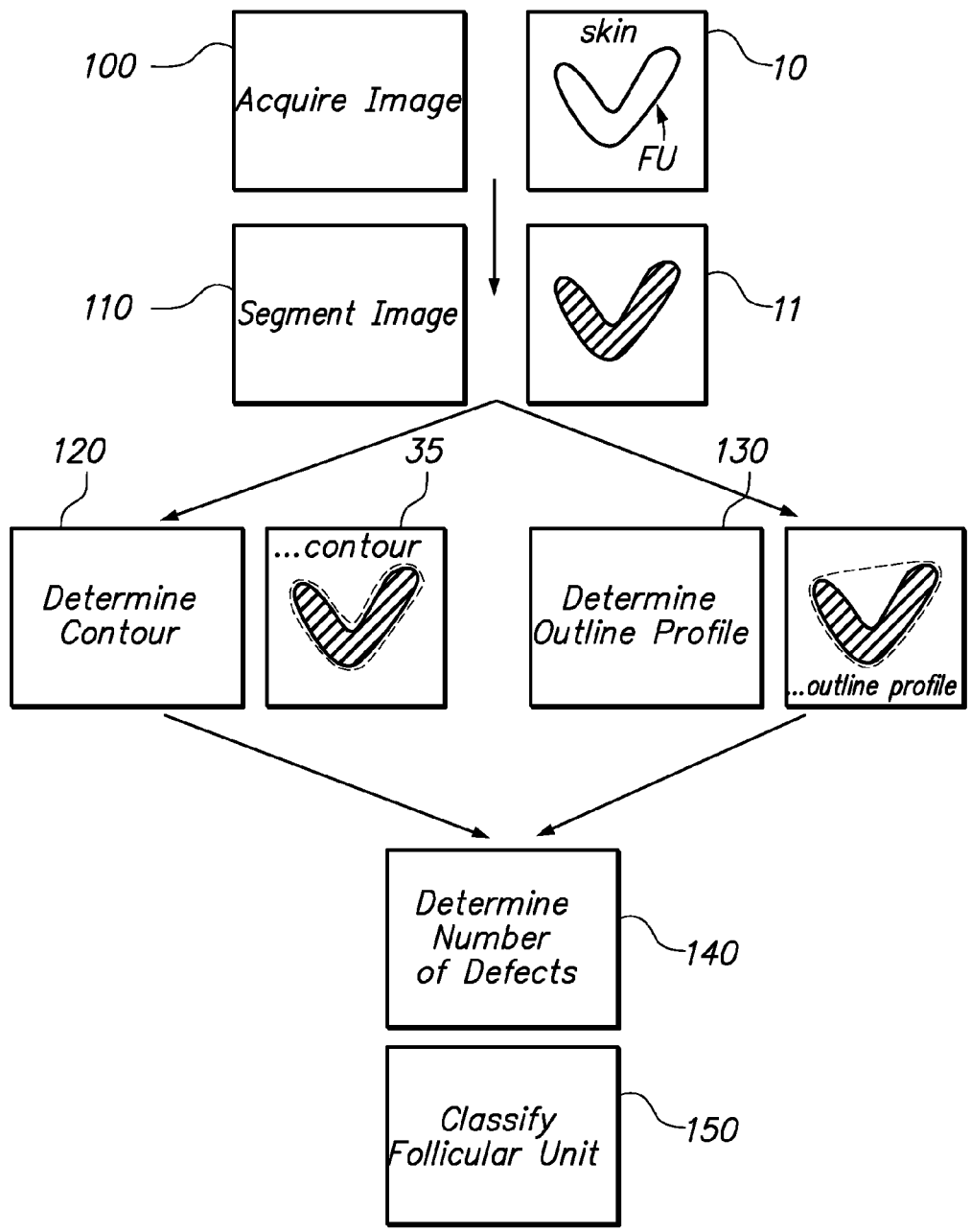
FIG. 9 is a flow chart of an exemplary embodiment of a method for classifying follicular units according to the present invention.

The basic steps of the above-described exemplary method of classifying a follicular unit are summarized in the flow chart of FIG. 9. FIG. 9 is simply a flow chart representation of the method described above. At step 100, an image 10 is acquired. The image 10 is segmented at step 110 to produce a segmented image 11. The contour 35 is determined at step 120, and the outline profile is determined at step 130. As explained above, steps 120 and 130 may be performed in any order, or simultaneously. At step 140, the number of defects is determined and at step 150 the classification of the follicular unit is determined based at least partially on the number of defects.

Figure 7:
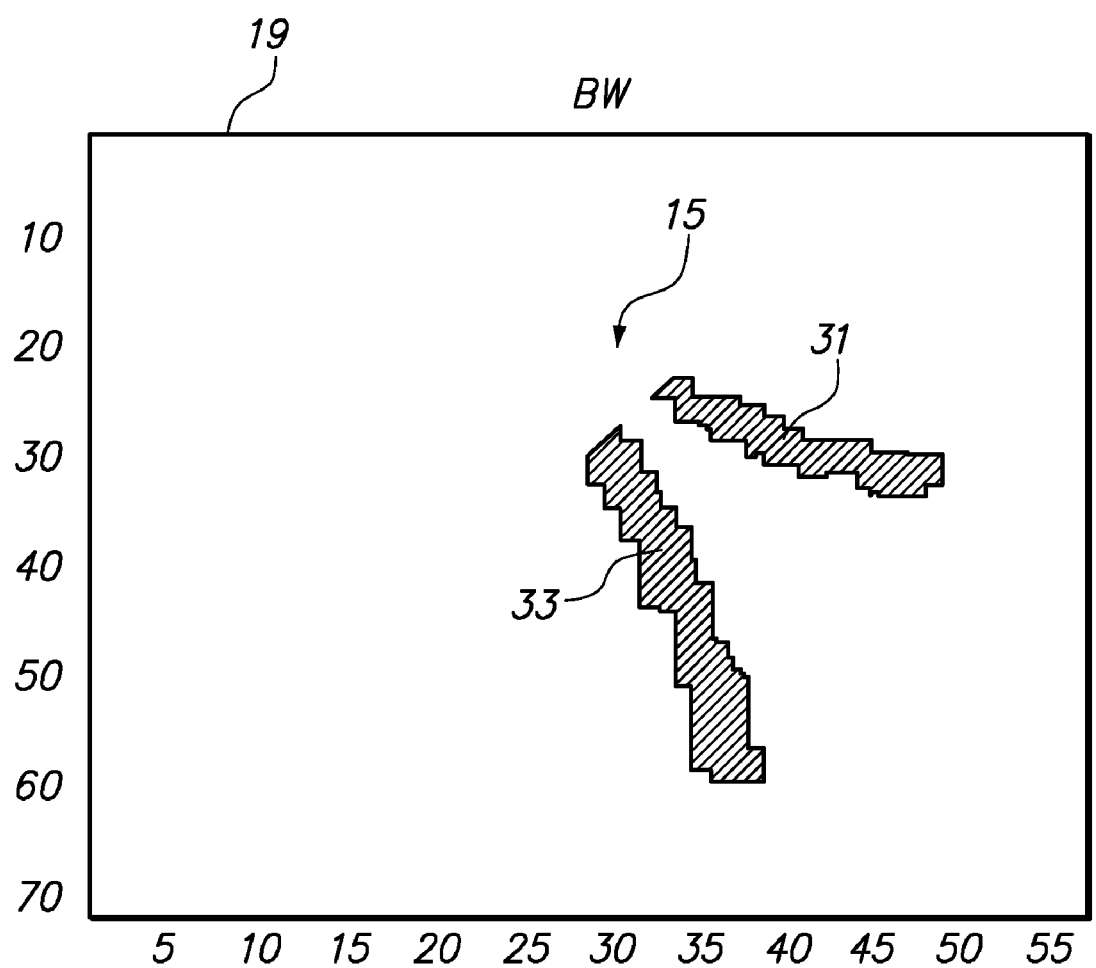
FIG. 7 is a print of a digital image which has been segmented which depicts hairs which appear to be separate but are actually part of the same follicular unit.

In some cases, the hairs of a single follicular unit may converge below the surface of the skin such that the binary image appears to have two separate hairs as shown in the example of FIG. 7. It is also possible that the hairs of a single follicular unit could appear as an F2 with two hairs emanating from a single point with a third hair slightly spaced apart, or similar situations. However, it is known that if what appears to be a separate hair is very close to another hair, it is likely that the hairs belong to the same follicular unit. This knowledge may be used to adjust the classification of the follicular unit to adjust for this situation. Therefore, to perform this adjustment, the distance between the hairs is determined using, for example, the digital image. Assuming that the hair 33 in FIG. 7 is a hair of the FU 15 of interest and hair 31 is a stray hair, then the method determines whether these hairs are part of the same follicular unit. In this example, the distance between the hairs 33 and 31 is calculated using the digital image. If the stray hair 31 is within a set maximum distance from the hair 33 of the FU 15 of interest, then it is assumed that the stray hair 31 is a part of the FU 15. The maximum distance between hairs which appear to be separate but are actually in the same follicular unit may be about 0.5 mm, or 0.7 mm or 0.3 mm, or a distance determined based on the physical characteristics of the patient or a sampling of patients. Thus, the FU 15 is classified as having the single hair 33 plus the hair 31 resulting in a classification as an F2.

The method of adjusting for separate hairs in very close proximity ("proximity method") can be used in conjunction with the "defect" method described above. For instance, the defect method could be performed first and then the proximity method could be performed, or vice versa.

Figure 8:
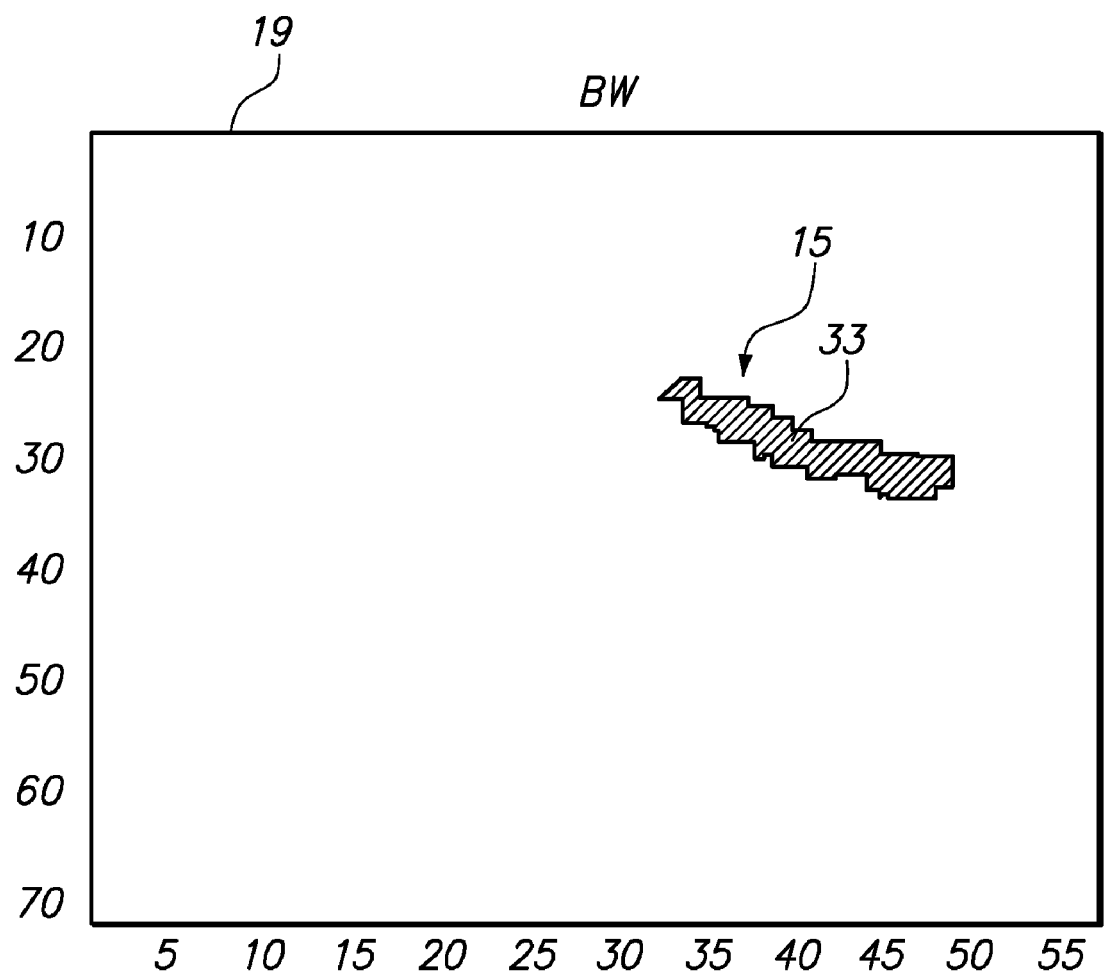
FIG. 8 is a print of a digital image which has been segmented which depicts what appears to be a single wide hair, but is actually two hairs of the same follicular unit.

Depending on the orientation of the camera(s) used to acquire the digital image of the region of interest 19, it is possible that an image appearing as a single hair could be two or more hairs whose images overlap from the angle of the camera. An example of this situation is depicted in FIG. 8. FIG. 8 is a print of a digital image which depicts an object that appears to be a single wide hair follicle, but is actually two hair follicles of the same follicular unit 15. To account for this situation in the classification of the FU 15, the width of each object 33 representing a hair follicle in the FU 15 is determined, for example, by using the digital image. As each exemplary object 33 representing a hair has a major axis generally parallel to the length of the object and a minor axis which is transverse to the major axis, the width of the exemplary object 33 is calculated along its minor axis.

In one exemplary embodiment, the width may be determined by simply measuring the distance across the image of each hair identified in the image. The width may be sampled at several locations along the length of each hair to determine a width. The average width, or each measured width, may then be used to determine whether the width exceeds a maximum expected width for a single hair. Then, it is determined whether the width of each object 33 representing a hair follicle, which is typically called the "caliber" of the hair, exceeds a maximum expected width for a single hair follicle. A single hair follicle is known to have a width of between about 50 microns ("um") and 100 um, with an average of about 75 um. Comparison of the width of the object 33 to the maximum width of a single hair allows to determine the actual type of the FU that object 33 represents.

Then, the step of classifying a follicular unit can also be based on a result of the comparison of the width of each object representing a hair in the FU with the maximum expected width for a single hair. For example, if the width is between 1½ and 2 times the expected width, then the step of classifying will approximate such object as being two hairs. A similar approximation can be done for 3, 4 or 5 hairs. This "width adjustment method" can be done in conjunction with either or both the defect method and the proximity method described above, and in any order.

In another aspect of the present invention, a method for determining the end points of a follicular unit (FU) is provided. Determining the end points may be used to help determine the angle and orientation of the follicular unit under the skin surface (i.e. subcutaneous), which can then be used to better position a harvesting tool, and to improve the robustness and accuracy of a hair transplantation procedure. Improved positioning of the harvesting tool based on the angle and orientation of the follicular unit reduces the chance of hair transaction during a harvesting procedure, and improves the efficacy of the hair transplantation procedure.

Figure 10:
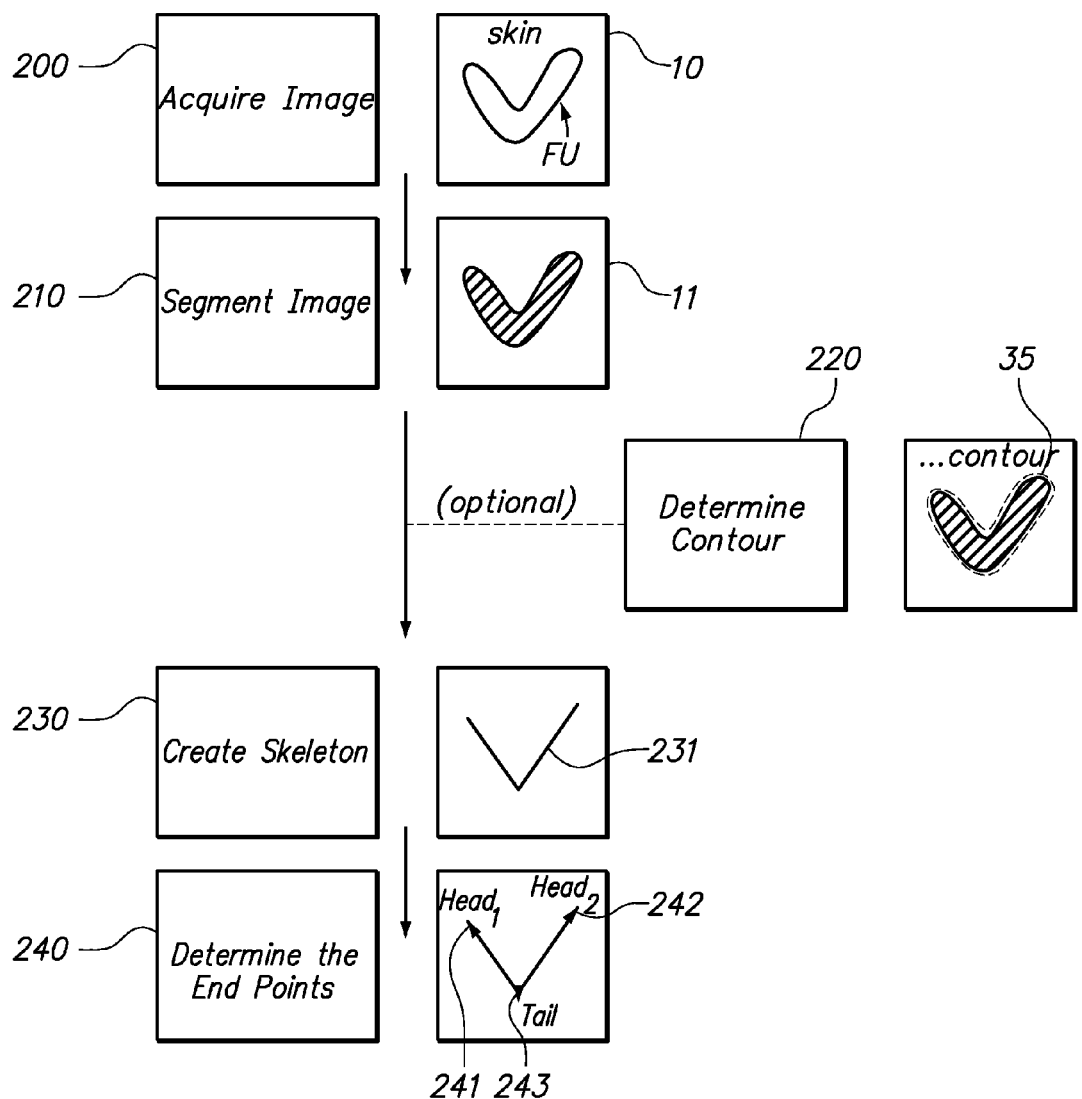
FIG. 10 is a flow chart of an exemplary embodiment of a method for locating the end points of the follicular unit according to the present invention

The method of determining the end points of an FU allows the determination of the end points of an FU both on or above the surface of the skin as well as subcutaneous end point(s). An exemplary embodiment of the method of the present invention comprises generating a skeleton of the segmented image of the FU. The segmented image may be created, as described above, by obtaining an image of interest and processing it to obtain a segmented image. Generating a skeleton or "skeletonization" is a process for reducing foreground regions in segmented image to a skeletal remnant that largely preserves the extent and connectivity of the original region of the image while discarding most of the original foreground pixels. This reduction of the foreground region occurs by peeling off a pattern of as many pixels as possible without affecting the general shape of the object being imaged. There are different ways of computing the skeleton of a segmented image. One exemplary approach is the thinning approach, whereby one successively erodes away pixels from the boundary while preserving the end points of line segments until no more thinning is possible (at which point what is left is the skeleton). Based on the skeleton, the end points (such as head 1, head 2 and tail in reference to the exemplary image of FIG. 10) are identified. Turning to FIG. 10, the basic steps of the above-described exemplary method of determining the end points of a follicular unit are summarized in flow chart form. The exemplary follicular unit of FIG. 10 is a two-hair follicular unit. At step 200, an image 10 is acquired. The image 10 is segmented at step 210 to produce a segmented image 11. At step 230, a skeleton 231 of the image is generated. At step 240, the end points are determined. In this non-limiting example, head 1 (241), head 2 (242) and tail (243) are determined and labeled.

While a skeleton, such as skeleton 231, can be created according to the method of present invention based on the segmented image alone, to improve the robustness and accuracy, and to adjust for the noise in the image, in certain cases it may be desirable to determine the contour of the FU as additional verification data used in creating a skeleton. The flow chart of FIG. 10 shows this additional optional step 220 where the contour 35 of the FU is determined so that creation of a skeleton is based on the information from the segmented image and also from the contour of the FU.

While the "thinning" process is one example of creating a skeleton, there are various alternative processes and techniques to create a skeleton that are within the scope of the present invention. By way of example and not limitation, such alternative techniques include using singularities in the distance transform to approximate the skeleton, edge detection based techniques, or Hilditch's algorithm.

In generating a skeleton of an image, noise can become a significant issue. Therefore, it may be helpful to create and utilize multiple images (including stereo images) to improve the quality of the image and the efficacy of creating an accurate skeleton. In that regard, in some embodiments of the present invention the method of determining the end points is further refined by using multiple images (including stereo images), or by determining the contour of the image as an additional data verification for generating the skeleton.

In yet another aspect of the present invention, a system for classifying follicular units is provided. As an exemplary embodiment, the system may comprise an image acquisition device and an image processor. Some non-limiting examples of an image acquisition device include one or more cameras, such as any commercially available cameras. The image acquisition device may take still images, or it could be a video recording device (such as a camcorder) or any other image acquisition device. Stereo imaging devices are currently preferred, but it is not necessary to have stereo imaging and the present invention is not so limited. Likewise, although it is preferred that the image acquisition device be a digital device, it is not necessary. For example, the image acquisition device could be an analog TV camera that acquires an initial image which is then processed into a digital image for further use in the method of the present invention. The image processor may comprise any suitable device programmed and configured to perform the method of classifying an FU according to the present invention. In one exemplary embodiment, the image processor for classifying an FU is configured for receiving an image of the FU, processing the image to produce segmented image, calculating a contour and an outline profile of the segmented image of the FU, determining the number of defects in the outline profile and classifying the FU based on the number of defects and optionally, the classification may also be based on certain additional adjustments, as necessary. By way of example, and not limitation, a suitable image processor may be any type of personal computer ("PC"). Alternatively, the image processor may comprise an Application Specific Integrated Circuit (ASIC) or Field Programmable Gate Array (FPGA).

According to a further aspect of the present invention, a system for determining the end points of an FU is provided. This system could be combined with, and be a part of, the previously described system for classifying follicular units, or it could be a separate and independent system. This system for determining the end points may comprise an image acquisition device and an end-point image processor. The image acquisition device of this system may be the same or different from the one described in reference to the system for classifying an FU. If two systems are combined, then a single image acquisition device may be used for all image acquisition purposes. The end-point image processor may be programmed and configured to perform the method of determining the end points of the FU according to present invention. In one embodiment, the end-point image processor is programmed and configured for receiving an image, processing it to produce segmented image of the FU, generating a skeleton of the FU and determining at least one end point of the FU. The examples and description of various appropriate image processors useful in the system for classifying FU are equally applicable to the image processor of the system for determining the end points. If two systems are combined, they may use the same image processor that is programmed and configured to perform all the combined and necessary steps of both methods, or they can use different image processors.

The image acquisition device of the FU classification system, or the end-points determination system, or the combination system may be mounted in a fixed position, or it may be mounted to a robotic arm or other controllable motion device. The robotic arm or motion device may be operatively coupled to a controller configured to control the motion of the robotic arm or motion device. The controller may receive and process images or data from the image processor with the controller configured to control the motion of the robotic arm or motion device based on the images or data acquired by the image acquisition device. In addition, the system may comprise other tools, devices and components useful in harvesting, and/or implantation of the FU, or in hair treatment planning.

Any or all of the systems and methods for classifying a follicular unit and/or determining the end points of a follicular unit as described herein may be used in conjunction with the system and method of harvesting and transplanting hair as described in U.S. patent application Ser. No. 11/380,903 and U.S. patent application Ser. No. 11/380,907.

The foregoing illustrated and described embodiments of the invention are susceptible to various modifications and alternative forms, and it should be understood that the invention generally, as well as the specific embodiments described herein, are not limited to the particular forms or methods disclosed, but to the contrary cover all modifications, equivalents and alternatives falling within the scope of the appended claims. By way of non-limiting example, it will be appreciated by those skilled in the art that the invention is not limited to the use of a robotic system including a robotic arm, and that other automated and semi-automated systems may be utilized. Moreover, the system and method of classifying and/or determining the end points of follicular units of the present invention can be a separate system used along with a separate automated transplantation system or even with a manual transplantation procedure.

The invention claimed is:

1. A method of classifying and determining at least one end point of a follicular unit (FU), comprising:
    using a processor, processing an image of a body surface containing an FU to produce a segmented image of the FU, the image of the body surface obtained from an image acquisition device;
    calculating a contour of the segmented image of the FU;
    calculating an outline profile of the segmented image which disregards concavities in the contour of the segmented image of the FU;

determining a number of defects in the outline profile;
classifying the FU at least partially based on the number of determined defects;
generating a skeleton of the segmented image of the FU; and
determining from the skeleton at least one end point of the FU.

2. The method of claim 1, wherein said at least one end point is selected from the group comprising:
a head of a hair of the FU;
a tail of a hair of the FU; and
a bulb of the FU.

3. The method of claim 1, further comprising determining an angle and/or orientation of the FU under the body surface based on the determined the at least one end point of the FU.

4. The method of claim 1, wherein generating the skeleton is accomplished using a thinning technique.

5. The method of claim 1, wherein generating the skeleton is accomplished using edge detection based techniques.

6. The method of claim 1, wherein generating the skeleton is accomplished using Hilditch's algorithm.

7. The method of claim 1, further comprising acquiring the image of a body surface containing an FU.

8. A method of determining at least one of a head or a tail of a follicular unit (FU), comprising:
processing an image of a body surface containing a FU to produce a segmented image of the FU, the image obtained from an image acquisition device;
using a processor, determining a contour of the segmented image of the FU;
generating a skeleton of the segmented image of the FU based on the segmented image of the FU and on the contour of the segmented image of the FU; and
determining from the skeleton at least one of a head or a tail of the FU.

9. A system for classifying and determining at least one end point of a follicular unit (FU), comprising:
an image acquisition device; and
an image processor comprising one or more modules for executing operations on an image, the one or more modules including instructions for:
processing an image obtained by the image acquisition device to produce a segmented image of the FU,
calculating a contour of the segmented image of the FU;
calculating an outline profile of the segmented image which disregards concavities in the contour of the segmented image of the FU;
determining a number of defects in the outline profile;
classifying the FU at least partially based on the number of determined defects;
generating a skeleton of the segmented image of the FU, and
determining from the skeleton at least one end point of the FU.

10. The system of claim 9, wherein the image acquisition device comprises at least one camera.

11. The system of claim 9, wherein the image acquisition device is a stereo imaging device.

12. The system of claim 9, wherein the image processor is a personal computer.

13. The system of claim 9, wherein the system is a robotic system.

14. The system of claim 13, further comprising a robotic arm on which said image acquisition device is mounted.

15. The system of claim 14, further comprising a controller operatively coupled to the robotic arm and said image processor.

16. The system of claim 9, wherein the image acquisition device acquires digital images.

17. The system of claim 9, wherein generating the skeleton is accomplished using one or more of a thinning technique, edge detection based techniques and Hilditch's algorithm.

18. A system for classifying a follicular unit (FU), comprising:
an interface adapted to receive an image data containing a FU; and
an image processor comprising one or more modules for executing operations on the image data, the one or more modules including instructions for:
processing the image data to produce a segmented image of the FU;
calculating a contour of the segmented image of the FU;
calculating an outline profile of the segmented image which disregards concavities in the contour of the segmented image of the FU;
determining a number of defects in the outline profile; and
classifying the FU at least partially based on the number of determined defects.

19. The system of claim 18, wherein the system further comprises an image processor programmed for generating a skeleton of the segmented image of the FU, and determining from the skeleton at least one end point of the FU.

20. The system of claim 19, wherein the image processor for classifying the FU and the image processor for determining the at least one end point of the FU are one combined image processing device.

21. The system of claim 19, further comprising one or more image acquisition devices and wherein the one or more image acquisition devices take multiple images of the FU to refine determination of the at least one end point of the FU.

* * * * *

UNITED STATES PATENT AND TRADEMARK OFFICE
CERTIFICATE OF CORRECTION

PATENT NO. : 7,627,157 B2  Page 1 of 1
APPLICATION NO. : 12/281613
DATED : December 1, 2009
INVENTOR(S) : Shehrzad A. Qureshi and Mohan Bodduluri It is certified that error appears in the above-identified patent and that said Letters Patent is hereby corrected as shown below:

Column 4, line 12, replace "minus" with --plus--.

Signed and Sealed this

Thirtieth Day of November, 2010

David J. Kappos
*Director of the United States Patent and Trademark Office*